(12) United States Patent
Bartling

(10) Patent No.: US 10,124,813 B2
(45) Date of Patent: Nov. 13, 2018

(54) DISCHARGE DEVICE FOR GRANULAR MATERIAL

(71) Applicant: NOWE GMBH, Elze (DE)

(72) Inventor: Werner Bartling, Elze (DE)

(73) Assignee: NOWE GMBH, Elze (DE)

( * ) Notice: Subject to any disclaimer, the term of this patent is extended or adjusted under 35 U.S.C. 154(b) by 216 days.

(21) Appl. No.: 15/029,408

(22) PCT Filed: Oct. 15, 2014

(86) PCT No.: PCT/EP2014/072088
§ 371 (c)(1),
(2) Date: Apr. 14, 2016

(87) PCT Pub. No.: WO2015/055699
PCT Pub. Date: Apr. 23, 2015

(65) Prior Publication Data
US 2016/0264153 A1    Sep. 15, 2016

(30) Foreign Application Priority Data

Oct. 15, 2013  (AT) .............................. A 50666/2013

(51) Int. Cl.
*B61C 15/10*  (2006.01)
*B60B 39/04*  (2006.01)
(Continued)

(52) U.S. Cl.
CPC .............. *B61C 15/10* (2013.01); *B60B 39/04* (2013.01); *B60B 39/06* (2013.01);
(Continued)

(58) Field of Classification Search
CPC ..... B60B 39/00; B60B 39/021; B60B 39/025; B60B 39/04; B61C 15/08; B61C 15/10; B61C 15/107
See application file for complete search history.

(56) References Cited

U.S. PATENT DOCUMENTS

| 4,385,729 A | 5/1983 | Wiederkehr |
| 5,795,108 A | 8/1998 | Lightle |
| 6,123,486 A * | 9/2000 | Wilms ............... B65G 53/4616 222/237 |

FOREIGN PATENT DOCUMENTS

| AT | 505783 | 4/2009 |
| CN | 2589427 Y | 12/2003 |

(Continued)

OTHER PUBLICATIONS

English translation of International Preliminary Report on Patentability for International Application No. PCT/EP2014/072088, filed Oct. 15, 2014.
(Continued)

*Primary Examiner* — Robert J McCarry, Jr.
(74) *Attorney, Agent, or Firm* — Paul D. Bianco; Katharine Davis; Fleit Gibbons Gutman Bongini & Bianco, PL

(57) ABSTRACT

A discharge device for granular materials, with a housing having at least one inlet for the granular materials, and with a rotor that is connected to a motor, rotates about an axis of rotation and has multiple vanes and chambers located between the vanes, the granular materials being conveyable from the at least one inlet to at least one outlet when the rotor rotates. The axis of rotation of the rotor is vertical and the rotor is preferably arranged inside an essentially cylindrical wear liner.

20 Claims, 4 Drawing Sheets

(51) Int. Cl.
 *B60B 39/06* (2006.01)
 *B65G 53/46* (2006.01)

(52) U.S. Cl.
 CPC .... *B65G 53/4616* (2013.01); *B60B 2360/324* (2013.01); *B60B 2900/1212* (2013.01); *B60B 2900/321* (2013.01); *B60B 2900/541* (2013.01)

(56) References Cited

FOREIGN PATENT DOCUMENTS

| CN | 2717898 Y | 8/2005 |
|---|---|---|
| CN | 101830353 A | 9/2010 |
| CN | 102159407 A | 8/2011 |
| DE | 2606483 | 8/1976 |
| DE | 3042413 | 5/1981 |
| DE | 3425895 | 2/1985 |
| DE | 3720988 | 1/1989 |
| DE | 19501179 | 7/1996 |
| WO | 2008064747 | 6/2008 |

OTHER PUBLICATIONS

Examination Report (with English translation) dated Jun. 30, 2017 for Chinese Application No. 201480056836.1.
International Search Report dated Jan. 15, 2015 for PCT/EP2014/072088, filed Oct. 15, 2014.
Written Opinion dated Apr. 23, 2015 for PCT/EP2014/072088, filed Oct. 15, 2014.
International Preliminary Report on Patentability for PCT/EP2014/072088, filed Oct. 15, 2014.
Office Action issued in Austrian Application No. A50666/2013 filed Oct. 15, 2013.

\* cited by examiner

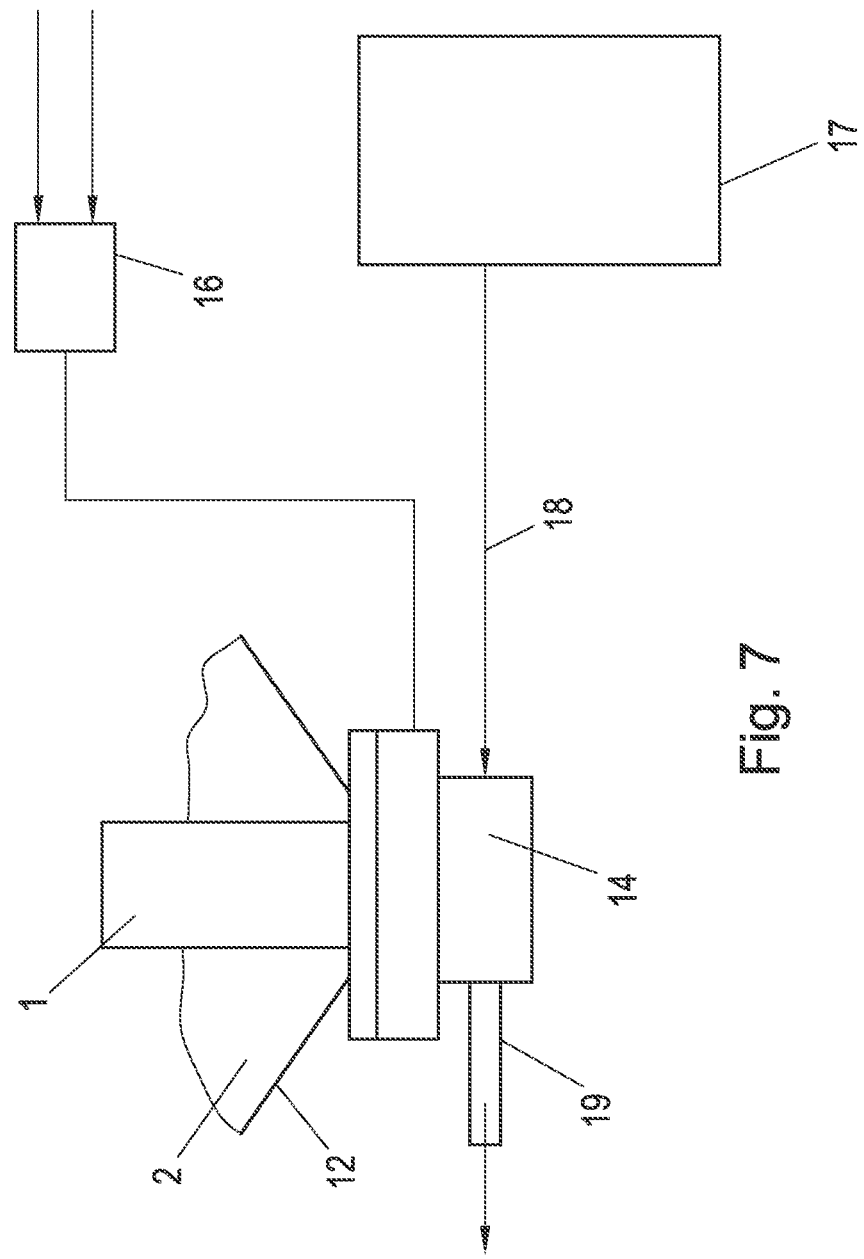

DISCHARGE DEVICE FOR GRANULAR MATERIAL

FIELD OF THE INVENTION

The invention relates to a discharge device for granular material, with a housing having at least one inlet for the granular material, and with a star feeder that is connected to a motor, rotates about an axis of rotation and has multiple vanes and chambers located between the vanes, in which chambers the granular material is conveyable from the at least one inlet to at least one outlet.

BACKGROUND

The term "granular material" refers to granular to powdery, easily pourable solid matter, for example grit or fine sand, such as is used for the improvement of the braking effect between the wheels of vehicles and the roadway. For instance, in the case of rail-bound vehicles, granular material or sand from a container is conveyed via a metering and conveying device via a nozzle in front of the rail wheels and into the gap between the rail wheel and the rail, to increase the frictional resistance between the rail wheel and the rail and reduce the breaking distance.

For example, the AT 505 783 B1 describes such a spreader, wherein metering of the grit takes place via a rotating star feeder.

Another discharge device, in which metering and conveying of the grit are effected by means of compressed air, is known e. g. from WO 2008/064747 A1.

In particular when using a relatively hard granular material, for example, quartz sand, there exists the problem of the components of the discharge device being subjected to relatively fast wear and tear, since the granular material or the sand leads to an accelerated deterioration of the discharge function or even to a malfunction due to the friction on the components of the discharge device. Using high-quality and durable materials for the components of the discharge device did not result in essential improvements, since blockades may occur in the process, whenever the hard granular material encounters moving parts of the discharge device likewise made of a hard material. Therefore, better results could be obtained when using softer, but also less durable materials, in particular for the moved parts of the discharge device. For example, star feeders are frequently made of plastics, reducing the service life considerably, however. Replacing the parts subject to wear and tear results in downtimes and assembly costs that are undesirable in most cases. In particular, in the case of discharge devices such as are frequently used in rail-bound vehicles, low downtimes and short maintenance intervals are not desired.

SUMMARY OF THE INVENTION

Hence, at least some embodiments of the present invention provide an above mentioned discharge device for a granular material, which is characterized by a low degree of wear, increased service life, and thus longer maintenance intervals. Any disadvantages of existing discharge devices with respect to wear are to be reduced or prevented.

In at least some embodiments according to the invention the axis of rotation of the star feeder is arranged vertically. The vertical arrangement of the axis of rotation of the star feeder alone may help improve the wear properties, since the granular material essentially trickles into the spaces of the star feeder by gravity and is conveyed to the at least one outlet upon rotation of the star feeder. In addition, a star feeder having a vertical axis of rotation can be assembled and disassembled more easily, and maintenance costs can also be reduced.

Advantageously, the star feeder is arranged within an essentially cylindrical wear sleeve. The wear sleeve, which may consist of an appropriate material, can be replaced easily and quickly, without the entire discharge device having to be replaced. The essentially vertical arrangement of the wear sleeve enables a simple and fast disassembly and assembly from the bottom side of the discharge device.

When the at least one outlet is arranged on the bottom side of the wear sleeve and is formed in an essentially slit-shaped or sector-shaped manner, then this will result in particularly advantageous paths of the granular material from the container of the granular material to the at least one outlet, and thus in a relatively short dwell time of the granular material within the discharge device or the star feeder, which in turn will lead to reduced wear and tear. When the outlet has a sector-shaped design, the outlet extends at least across one or several chambers between the vanes of the star feeder. Downstream of the at least one outlet, the granular material can be conveyed to the desired destination in different ways, e. g. by means of mechanic or pneumatic conveyance.

Ideally, the star feeder comprises at least eight vanes. This results in at least eight chambers between the vanes of the star feeder, within which chambers the granular material is conveyed. The more vanes or chambers arranged between the former the star feeder comprises, the lower the dwell time of the granular material essentially is between the star feeder and thus the wear of the star feeder or the wear sleeve surrounding the star feeder.

If the vanes of the star feeder are designed like blades, this may further optimize the transport of the granular material by means of the star feeder to the at least one outlet and the friction of the granular material on the vanes of the star feeder may be reduced.

If the vanes of the star feeder are rearranged obliquely to the direction of the axis of rotation, this may further optimize the transport of the granular material. Arranging the vanes obliquely—in contrast to a straight arrangement of the vanes—leads to a horizontal and a vertical direction of force. In particular, the vertical force component leads to a specific conveyance of the granular material downwards, thus enabling a more intense discharge of granular material.

The housing of the discharge devices is preferably designed to be arranged within a container for the granular material, and the at least one inlet is arranged laterally of the housing. On the one hand, such a construction contributes to keep low the overall heights of the container for granular material and the discharge device as well as the possible material handling equipment and to facilitate maintenance, since the discharge device may be disassembled from below from the container for granular material and be assembled again. On the other hand, when the discharge device is arranged in the container for granular material, this also achieves optimum protection against external influences in a simple way and thus prevents undesired interference potentials and thus system failures. In addition, the gravity is used optimally in that the granular material may trickle from the container and into the at least one inlet without any assistance. From the inlets arranged laterally of the housing, the granular material passes directly into the chambers between the vanes of the star feeder and is conveyed upon rotation of the star feeder and then reaches the at least one outlet arranged correspondingly, for further conveyance of the granular material.

Advantageously, two opposite inlets are provided in the housing. This can increase the amount of granular material conveyed, with the rotational speed of the star feeder remaining the same, or reduce the rotational speed of the star feeder, with the amount of granular material conveyed staying the same. In addition, in the case of two or more inlets, the paths of the granular material within the discharge device between the inlet and the outlet may be reduced and thus the wear may likewise be reduced.

Optimum trickling or flowing conditions for the granular material are given when the inlets extend obliquely downwards, preferably at an angle of 30 to 40° to the horizontal line. It is an advantage if the bottom side of the container of granular material is already arranged obliquely in a similar manner and merges into the inlets of the discharge device that are arranged obliquely.

When the motor is arranged above the star feeder, this can facilitate the assembly and disassembly of the wear components of the discharge device. Fastening elements for fastening a device for conveying the granular material are provided on the bottom side of the housing, which conveying device may be designed in different ways. Depending on the application, mechanical or pneumatic conveying devices are mainly used.

Furthermore, it is an advantage if the wear sleeve is movable relative to the star feeder in the direction of the axis of rotation of the star feeder. Thus, compensation of the wear or readjustment of the discharge device may be achieved and the service life and the maintenance intervals can be increased.

Said readjustment can be effected, among other things, in that the wear sleeve is supported to be movable towards the star feeder by at least one spring. By means of the spring-supported, movable support of the wear sleeve, the abrasive wear on the wear sleeve and/or the star feeder can be compensated to a certain degree and thus the service life of the discharge device can be increased.

Alternatively, the star feeder, together with the motor, can be supported to be movable towards the wear sleeve by at least one spring. The at least one spring presses the star feeder against the wear sleeve and thus compensates any wear to a certain degree.

According to another feature of the invention, the vanes of the star feeder are provided on the bottom side so as to extend oblique with respect to the axis of rotation of the star feeder, and the bottom side of the wear sleeve is designed in a funnel-shaped manner complementary to the vanes of the star feeder. Thereby, conveyance of the granular material within the discharge device is further supported and the wear due to friction of the granular material on the components of the discharge device is reduced.

Advantageously, the star feeder is made of plastic, preferably polyurethane. Plastic is relatively cheap and has a good corrosion resistance. Ultra-high molecular polyethylene has particularly good wear properties. Theoretically, metallic materials are also conceivable for the star feeder and the wear sleeve. One of the two components, however, should be flexible vis-á-vis the other component and therefore should preferably be made of plastic.

The wear sleeve may also be made of plastic, preferably an ultra-high molecular polyethylene.

BRIEF DESCRIPTION OF THE DRAWINGS

Below the invention will be described in more detail on the basis of the attached drawings in which:

FIG. 7 shows a schematic block diagram of an application of the discharge device in a sand spreader.

DETAILED DESCRIPTION OF THE INVENTION

Figure 1:
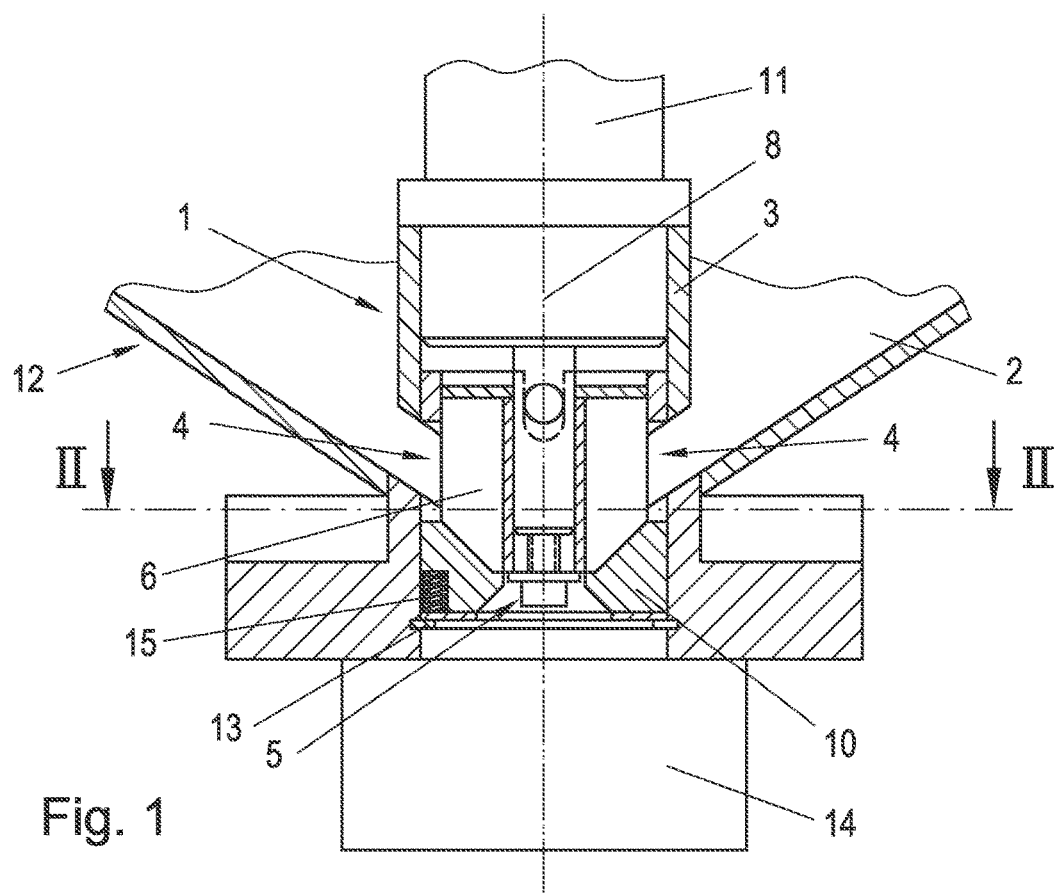
FIG. 1 shows a vertical sectional view of a variant of a discharge device.
Figure 2:
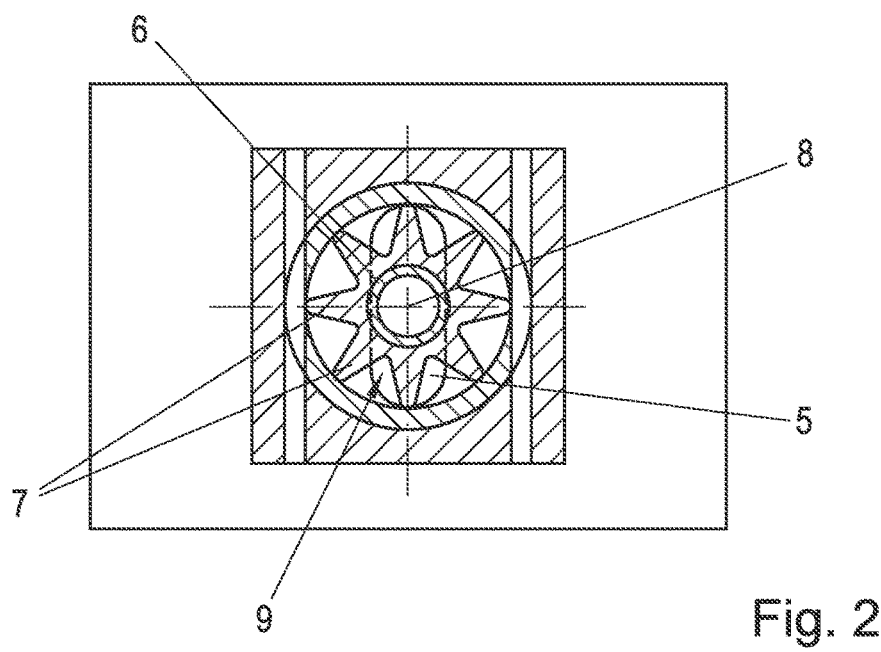
FIG. 2 shows the discharge device according to FIG. 1 along the cutting line II-II.

FIG. 1 shows a vertical sectional view of a variant of a discharge device 1. The discharge device 1 is preferably arranged within a container 12 for the granular material 2. Optimum protection of the discharge device 1 against external influences is achieved in a simple way by means of a vertical mounting position of the discharge device 1 within the container 12 for the granular material 2 and thus undesired interference potentials and thus system failures are effectively prevented. The discharge device 1 comprises a housing 3 having at least one inlet 4 for the granular material 2 and a star feeder 6 connected to a motor 11. The star feeder 6 comprises several vanes 7 and chambers 9 arranged between them, in which the granular material 2 is conveyed from the at least one inlet 4 to the at least one outlet 5 upon rotation of the star feeder 6. The vanes 7 and the chambers 9 of the star feeder 6 are better illustrated in the sectional view according to FIG. 2. According to the invention, the axis of rotation 8 of the star feeder 6 is arranged essentially vertically, so that by force of gravity the granular material 2 can pass via the at least one inlet 4 and into the chambers 9 of the star feeder 6 and is conveyed to the at least one outlet 5 upon rotation of the star feeder 6. Due to the arrangement according to the invention, the paths of the granular material 2 within the discharge device 1 are minor and the dwell time of the granular material 2 in the discharge device 1 is short, due to which any wear, in particular of the star feeder 6 can be kept at a minimum. Ideally, the star feeder 6 is arranged within an essentially cylindrical wear sleeve 10. In the construction of the present type, the wear sleeve 10 and the star feeder 6 are characterized by a high service life and long maintenance intervals. Nevertheless, should they need to be replaced, they can easily be replaced from the bottom side of the container 12 for the granular material 2. Advantageously, the star feeder 6 comprises at least eight vanes 7 and thus eight chambers 9. Preferably, the inlets 4 are arranged laterally of the housing 3 of the discharge device 1 and are arranged to be inclined just like the bottom side of the container 12 for the granular material 2. Preferably, the at least one outlet 5 of the discharge device 1 is arranged on the bottom side of the wear sleeve 10 and is preferably formed in a slit-like manner, as can be seen in FIG. 2. The abrasion of the granular material 2 on the star feeder 6 or its vanes 7 and the wear sleeve 10 will result in abrasion which, as of a certain degree, will result in the fact that no optimum transport or metering of the granular material 2 can take place. To prevent the wear parts of the discharge devices 1 from having to be replaced frequently, in accordance with the invention the wear sleeve 10 is designed to be movable relative to the star feeder 6 in the axis of rotation 8 of the star feeder 6. In the variant of embodiment according to FIGS. 1 and 2, this is effected by at least one spring 15 which presses the wear sleeve 10 towards the star feeder 6. In this manner, readjustment of the wear sleeve 10 in relation to the star feeder 6 can take place to a certain degree, for example, some millimeters, and thus the service life of the discharge device 1 can be increased and the maintenance intervals be prolonged.

The star feeder 6 is preferably made of plastic, preferably polyurethane, whereas the wear sleeve 10 may likewise be made of plastic, preferably ultra-high molecular polyethylene. The housing 3 of the discharge device 1 is preferably made of corrosion-resistant, lightweight metal, e. g. aluminum or an aluminum alloy. The motor 11 for driving of the star feeder 6, which is preferably arranged above the star feeder 6 to facilitate the assembly and disassembly of the star feeder 6, may be formed by a DC gear motor.

Figure 3:
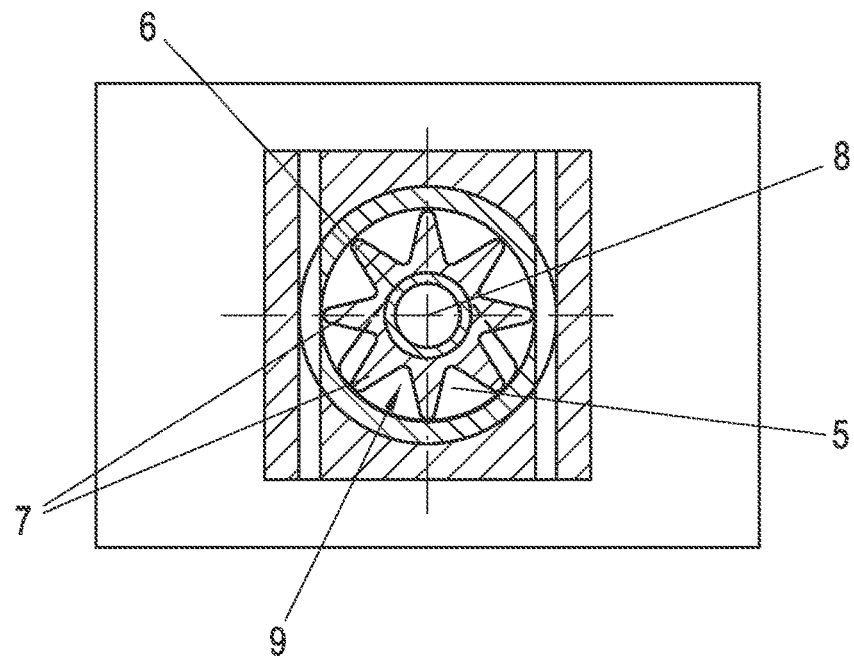
FIG. 3 shows the discharge device according to FIG. 1 along the cutting line II-II in a modified form.

In the variant of embodiment according to FIG. 3, the outlet 5 is not designed in a slit-shaped but sector-shaped manner and includes e. g. three chambers 9 between the vanes 7 of the star feeder 6. For the metering of particularly large amounts of granular material 2, the intake for the granular material 2 can be arranged differently, i. e. the inlet may be arranged horizontally and the outlet vertically next to the star feeder (not shown). Such a variant of embodiment has also advantages regarding a small size of the discharge device.

Figure 4:
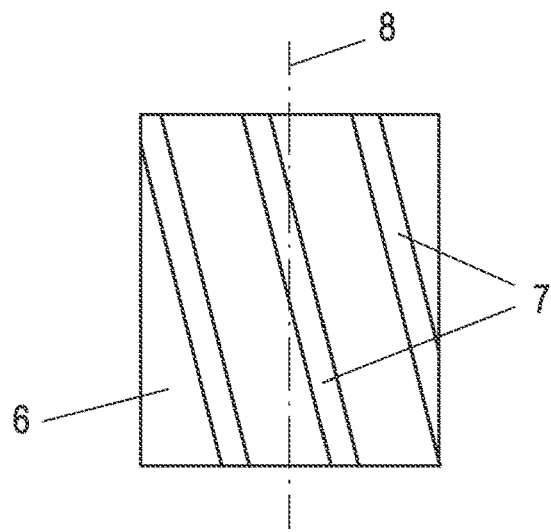
FIG. 4 shows a side view of a variant of an embodiment of the star feeder.

FIG. 4 shows a variant of an embodiment of the star feeder 6 in side view, wherein the vanes 7 are arranged obliquely to the axis of rotation 8. Optimization of the transport of the granular material 2 can be obtained thereby. In contrast to a straight arrangement of the vanes 7, the oblique arrangement of the vanes 7 leads to a horizontal and vertical direction of force. In particular, the vertical force component leads to a specific conveyance of the granular material 2 downwards, thus enabling a more intense discharge of granular material.

Figure 5:
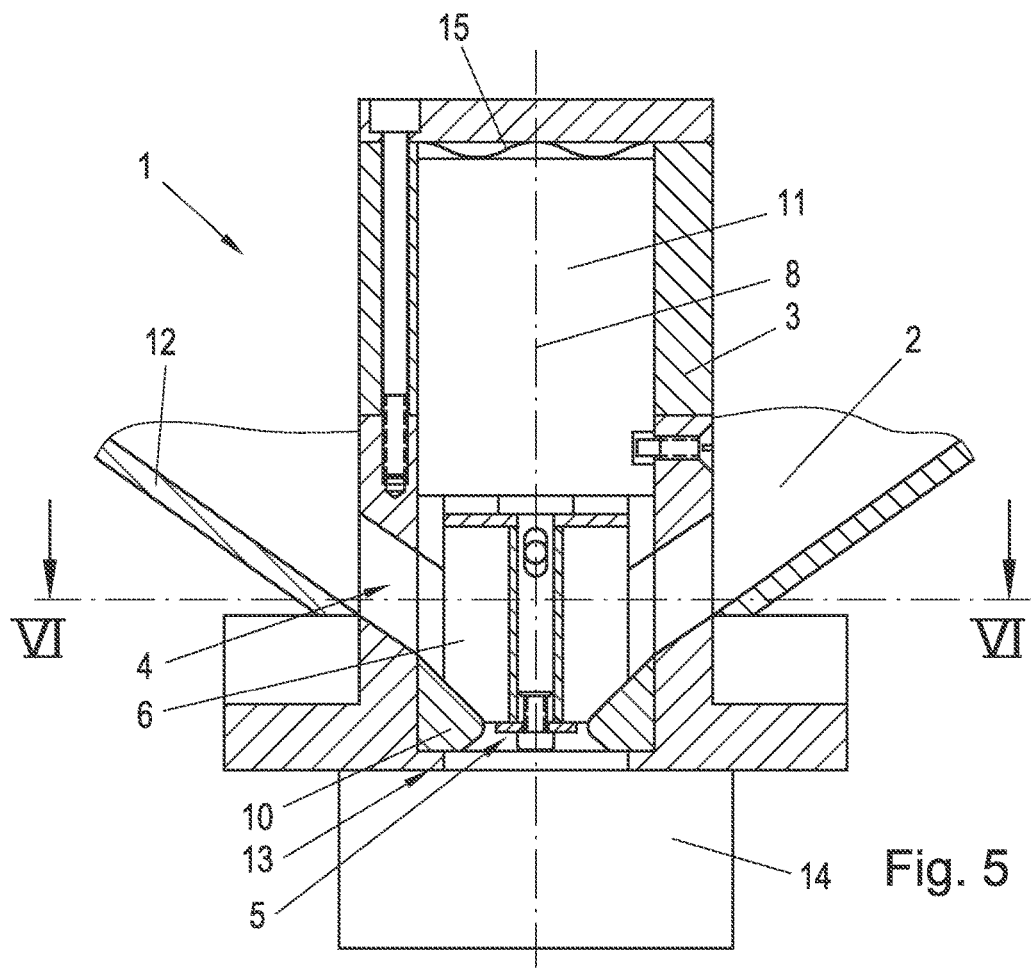
FIG. 5 shows a vertical sectional view of a further variant of a discharge device.
Figure 6:
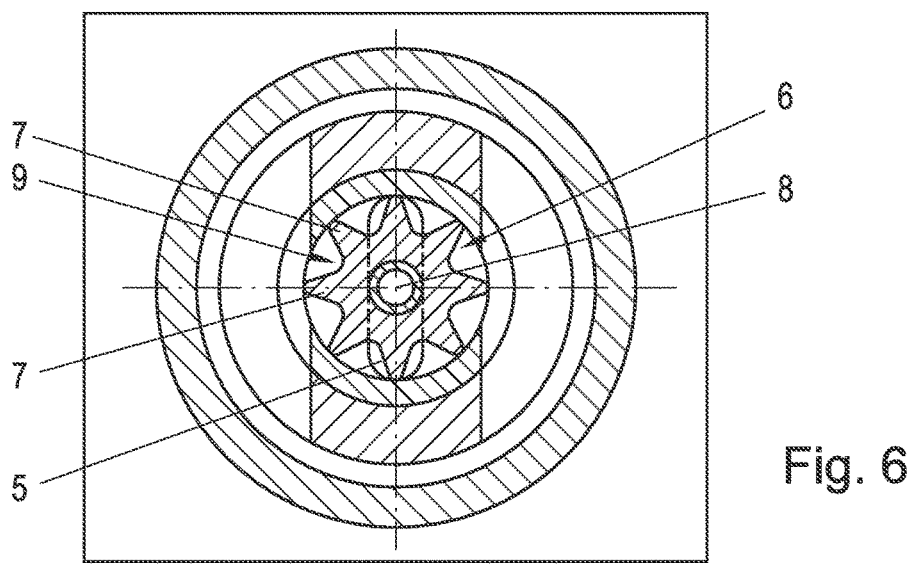
FIG. 6 shows the discharge device according to FIG. 5 along the cutting line VI-VI.

FIG. 5 and FIG. 6 show another variant of the discharge device 1 in vertical and horizontal sectional views, with a wear tracking that is modified as compared to the variant according to FIGS. 1 and 2. In this variant of the embodiment, the wear sleeve 10 is not biased towards the star feeder 6, but the star feeder 6, together with the motor 11, is pressed against the wear sleeve 10 via at least one spring 15. Readjustment or wear compensation may take place in this manner, too. In other respects, the components are essentially identical to those shown in FIGS. 1 and 2. Since the motor 11 and the star feeder 6 are moved with respect to the wear sleeve 10, the fastening elements for fastening the motor within the housing 3 have to be arranged in corresponding oblong holes that permit a movement in the direction of the axis of rotation 8 by some millimeters.

Finally, FIG. 7 shows a schematic block diagram of a use of the discharge device 1 in a sand spreader. The discharge device 1 is arranged in the container 12 for the granular material 2 and is connected to a corresponding control device 16. The control device 16 controls the speed of the star feeder 6 in the discharge device 1 and thus the amount of granular material passed on to the conveying device 14 that is arranged below the discharge device. In the shown example, the conveying device 14 for conveying the granular material 2 is formed by a pneumatic conveying device. For this purpose, compressed air is fed into the conveying device 14 from a compressed air source 17 via a compressed air line 18 and the granular material trickling down from the discharge device 1 via the at least one outlet 5 is conveyed via a conveying line 19 to the desired destination, e. g. in front of the rail wheel of a rail-bound vehicle.

Of course, other variants of the control of the discharge device 1 and the conveyance of the granular material 2 are also conceivable.

The present invention is characterized by optimum wear properties, without the construction of the discharge device having to be particularly complex or costly.

The invention claimed is:

1. A discharge device for granular material, the discharge device comprising:
    a housing configured for arrangement within a container for the granular material;
    at least one inlet for intake of the granular material, the at least one inlet arranged laterally on the housing and extending obliquely downward into the housing;
    a star feeder operably-connected to a motor and arranged within a cylindrical wear sleeve, the star feeder including:
        a vertical axis of rotation;
        a plurality of vanes extending radially from the vertical axis; and
        a plurality of chambers formed between the vanes of the plurality of vanes; and
    at least one outlet for discharging the granular material, the at least one outlet arranged on a bottom side of the cylindrical wear sleeve;
    wherein, when the star feeder rotates, the granular material is conveyable from the at least one inlet in the plurality of chambers to the at least one outlet.

2. The discharge device according to claim 1, wherein the plurality of vanes includes at least eight vanes.

3. The discharge device according to claim 1, wherein each vane of the plurality of vanes is formed as an elongated blade.

4. The discharge device according to claim 1, wherein the vanes of the plurality of vanes are arranged obliquely with respect to the vertical axis of rotation.

5. The discharge device according to claim 4, wherein the plurality of vanes is arranged on a bottom side of the star feeder.

6. The discharge device according to claim 5, wherein a bottom side of the cylindrical wear sleeve has a funnel shape complementary to the plurality of vanes.

7. The discharge device according to claim 1, wherein the at least one inlet is arranged at an angle of 30° to 40° to a horizontal line.

8. The discharge device according to claim 1, wherein the motor is positioned above the star feeder.

9. The discharge device according to claim 1, further comprising fastening elements for fastening a device for conveying the granular material, the fastening elements arranged on a bottom side of the housing.

10. The discharge device according to claim 1, wherein the cylindrical wear sleeve is moveable relative to the star feeder in a direction of the vertical axis of rotation of the star feeder.

11. The discharge device according to claim 10, further comprising at least one spring for supporting the cylindrical wear sleeve when the cylindrical wear sleeve is moving toward the star feeder.

12. The discharge device according to claim 1, wherein the star feeder and the motor are configured to be moveable together toward the cylindrical wear sleeve.

13. The discharge device according to claim 12, further comprising at least one spring for supporting the star feeder and the motor when the star feeder and the motor are moving toward the cylindrical wear sleeve.

14. The discharge device according to claim 1, wherein the star feeder is made of a plastic material.

15. The discharge device according to claim 14, wherein the plastic material is polyurethane.

16. The discharge device according to claim 1, wherein the cylindrical wear sleeve is made of a plastic material.

17. The discharge device according to claim 16, wherein the plastic material is an ultra-high molecular polyethylene.

18. A discharge device for granular material, the discharge device comprising:
- a housing configured for arrangement within a container for the granular material;
- a first inlet for intake of the granular material and a second inlet for intake of the granular material opposite the first inlet, both the first and the second inlets arranged laterally on opposing sides of the housing and extending obliquely downward into the housing;
- a star feeder operably-connected to a motor and arranged within a cylindrical wear sleeve, the star feeder including:
  - a vertical axis of rotation;
  - a plurality of vanes extending radially from the vertical axis; and
  - a plurality of chambers formed between the vanes of the plurality of vanes; and
- at least one outlet for discharging the granular material, the at least one outlet arranged on a bottom side of the cylindrical wear sleeve;
- wherein, when the star feeder rotates, the granular material is conveyable from the first inlet and the second inlet in the plurality of chambers to the at least one outlet.

19. The discharge device according to claim 18, wherein the first inlet and the second inlet are each arranged at an angle of 30° to 40° to a horizontal line.

20. A discharge device for granular material, the discharge device comprising:
- a housing configured for arrangement within a container for the granular material;
- at least one inlet for intake of the granular material, the at least one inlet arranged laterally on the housing and extending obliquely downward into the housing at an angle of 30° to 40° to a horizontal line;
- a star feeder operably-connected to a motor and arranged within a plastic cylindrical wear sleeve, the star feeder including:
  - a vertical axis of rotation;
  - a plurality of vanes extending radially from the vertical axis; and
  - a plurality of chambers formed between the vanes of the plurality of vanes; and
- at least one outlet for discharging the granular material, the at least one outlet arranged on a bottom side of the cylindrical wear sleeve;
- wherein, when the star feeder rotates, the granular material is conveyable from the at least one inlet in the plurality of chambers to the at least one outlet.

\* \* \* \* \*